(12) United States Patent
Chang et al.

(10) Patent No.: US 11,878,214 B2
(45) Date of Patent: Jan. 23, 2024

(54) METHODS AND SYSTEMS FOR BICYCLE FITTING

(71) Applicant: GIANT MANUFACTURING CO., LTD., Taichung (TW)

(72) Inventors: Ya-Han Chang, Taichung (TW);
Chang-Hsin Hsieh, Taichung (TW);
Pei-Min Wu, Taichung (TW);
Yen-Ching Chu, Taichung (TW);
Sheng-Ho Shu, Taichung (TW);
Jun-Rong Chen, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 190 days.

(21) Appl. No.: 17/213,320

(22) Filed: Mar. 26, 2021

(65) Prior Publication Data
US 2021/0308523 A1    Oct. 7, 2021

Related U.S. Application Data

(60) Provisional application No. 63/003,743, filed on Apr. 1, 2020.

(51) Int. Cl.
*A63B 24/00* (2006.01)
*A63B 22/06* (2006.01)

(52) U.S. Cl.
CPC ...... *A63B 24/0062* (2013.01); *A63B 24/0075* (2013.01); *A63B 22/0605* (2013.01);
(Continued)

(58) Field of Classification Search
CPC ..... A63B 1/00; A63B 3/00; A63B 2024/0068; A63B 24/0062; A63B 2024/0071;
(Continued)

(56) References Cited

U.S. PATENT DOCUMENTS

2007/0142177 A1    6/2007  Simms et al.
2013/0065733 A1    3/2013  Kautz et al.
(Continued)

FOREIGN PATENT DOCUMENTS

CN    102826146 A    12/2012
CN    108628436 A    10/2018
(Continued)

OTHER PUBLICATIONS

Cockcroft, S. (2011). An evaluation of inertial motion capture technology for use in the analysis and optimization of road cycling kinematics [PhD dissertation]. University of Stellenbosch. (Year: 2011).*
(Continued)

*Primary Examiner* — Daniel R Miller
*Assistant Examiner* — Eric Sebastian Von Wald
(74) *Attorney, Agent, or Firm* — Finnegan, Henderson, Farabow, Garrett & Dunner, L.L.P

(57) ABSTRACT

A method for bicycle fitting includes receiving evaluation factors based on one or more scenario parameters; positioning at least one of a saddle and a handlebar to one or more positions when a user is pedaling; determining values for the evaluation factors according to data received from one or more sensors at the one or more positions; and processing the values to identify one or more recommended positions for the saddle or the handlebar.

17 Claims, 13 Drawing Sheets

(52) U.S. Cl.
CPC ... *A63B 2024/0068* (2013.01); *A63B 2220/30* (2013.01); *A63B 2220/40* (2013.01); *A63B 2220/56* (2013.01); *A63B 2220/803* (2013.01); *A63B 2230/06* (2013.01); *A63B 2230/08* (2013.01); *A63B 2230/40* (2013.01)

(58) Field of Classification Search
CPC . A63B 24/0087; A63B 22/06; A63B 22/0605; A63B 2220/30; A63B 2220/00; A63B 2220/10; A63B 2220/17; A63B 2220/18; A63B 2220/20; A63B 2220/80; A63B 2220/803; A63B 2220/83; A63B 2220/833; A63B 2220/40; A63B 2220/50; A63B 2220/56; A63B 2220/58; A63B 2230/06; A63B 2230/08; A63B 2230/40; A63B 2024/0065; A63B 24/0075; B62J 2001/085; B62J 1/08; B62J 99/00; B62K 21/12; B62K 21/18; B62K 21/26; B62K 3/02; G06N 20/00; G05B 13/00; G05B 19/00
See application file for complete search history.

(56) References Cited

U.S. PATENT DOCUMENTS

| | | | |
|---|---|---|---|
| 2014/0379135 A1 | 12/2014 | Kristiansen et al. | |
| 2017/0332956 A1 | 11/2017 | Bigolin et al. | |
| 2020/0239103 A1* | 7/2020 | Abbey | B62J 45/4152 |

FOREIGN PATENT DOCUMENTS

| | | | | |
|---|---|---|---|---|
| CN | 110114262 A | * | 8/2019 | A61B 5/11 |
| CN | 110114262 A | | 8/2019 | |
| JP | 2010-105474 A | | 5/2010 | |
| JP | 2017-013657 A | | 1/2017 | |
| KR | 20140001898 U | | 4/2014 | |
| TW | 200819168 A | | 5/2008 | |
| TW | 201228632 A | | 7/2012 | |
| TW | I 458521 B | | 11/2014 | |

OTHER PUBLICATIONS

European Search Report issued for Application No. 21165936.2 dated Jul. 15, 2021, 11 pages.
Norman, Paul, new idmatch bike fitting system automatically adjusts your fit as you pedal, https://www.cyclingweekly.com/news/product-news/new-idmatch-bike-fitting-system-automatically-adjusts-fit-pedal-391108, 7 pages, retrieved Jul. 7, 2021.

* cited by examiner

METHODS AND SYSTEMS FOR BICYCLE FITTING

CROSS-REFERENCE TO RELATED APPLICATIONS

This application is based upon and claims priority to U.S. Provisional Patent Application No. 63/003,743, filed on Apr. 1, 2020, and entitled "METHODS AND SYSTEMS FOR BICYCLE FITTING," which is incorporated herein by reference in its entirety.

TECHNICAL FIELD

The present disclosure generally relates to cycling, and more particularly, to methods and systems for bicycle fitting.

BACKGROUND

Cycling represents an example of a human working with a machine. For a human to work seamlessly with a machine, the fit between the two can be an important consideration. Each person differs from another in height, weight, gender, body build, body mass index, muscle strength, muscle density, lengths and strengths of different parts of the body, posture, efficiency, speed, and many other considerations or measurements. Fitting one or more of these factors to a machine, a machine's geometry, terrain, road conditions, and other variables can be important. It can also involve safety, health, performance, and other indicators. Regardless of whether cycling occurs for leisure, for workout, for competitive sports, or for other reasons, proper or better fit can result in improvement or variation in one or more indicators, making the cycling activity more enjoyable, rewarding, efficient, and/or safe.

In cycling races or other cycling events, a so-called "bicycle fitting" technique has been developed to improve the athlete's endurance and achieve appropriate "fit" between a rider and a bicycle. By fitting the bicycle to a rider, various aspects, variables, and/or geometry of the bicycle may be adjusted in accordance with the size, physique, capability, riding styles, riding habits, and/or other aspects of the rider to improve one's riding performance, efficiency, and/or safety. As cycling continues to grow in popularity and certain events and activities become increasing competitive, it may be desirable to have accurate, effective, and/or efficient bicycle fitting. It may also be desirable to provide fitting methods or systems and provide them to professional, semi-professional, and leisure cyclists.

SUMMARY OF THE PRESENT DISCLOSURE

Consistent with some embodiments, a method for bicycle fitting is provided. The method for bicycle fitting includes: receiving a plurality of evaluation factors based on one or more scenario parameters; positioning at least one of a saddle and a handlebar to one or more positions when a user is pedaling; determining values for the plurality of evaluation factors according to data received from one or more sensors at the one or more positions; and processing the values to identify one or more recommended positions for the saddle or the handlebar.

Consistent with some embodiments, an apparatus is provided. The apparatus includes: one or more sensors; a saddle and a handlebar; one or more storage devices configured to store a set of instructions; and one or more processors configured to execute the set of instructions to cause the apparatus to: receive a plurality of evaluation factors based on one or more scenario parameters; position at least one of the saddle and the handlebar to one or more positions when a user is pedaling; determine values for the plurality of evaluation factors according to data received from the one or more sensors at the one or more positions; and process the values to identify one or more recommended positions for the saddle or the handlebar.

Consistent with some embodiments, a non-transitory computer-readable medium is provided. The non-transitory computer-readable medium stores a set of instructions that is executable by one or more processors of an apparatus to cause the apparatus to initiate a method for bicycle fitting. The method includes: receiving a plurality of evaluation factors based on one or more scenario parameters; positioning at least one of a saddle and a handlebar to one or more positions when a user is pedaling; determining values for the plurality of evaluation factors according to data received from one or more sensors at the one or more positions; and processing the values to identify one or more recommended positions for the saddle or the handlebar.

It is to be understood that the foregoing general descriptions and the following detailed descriptions are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, are examples for explaining the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts. The implementations set forth in the following description of exemplary embodiments are examples of devices and methods consistent with the aspects related to the disclosure as recited in the appended claims, and not meant to limit the scope of the present disclosure.

Figure 1A:
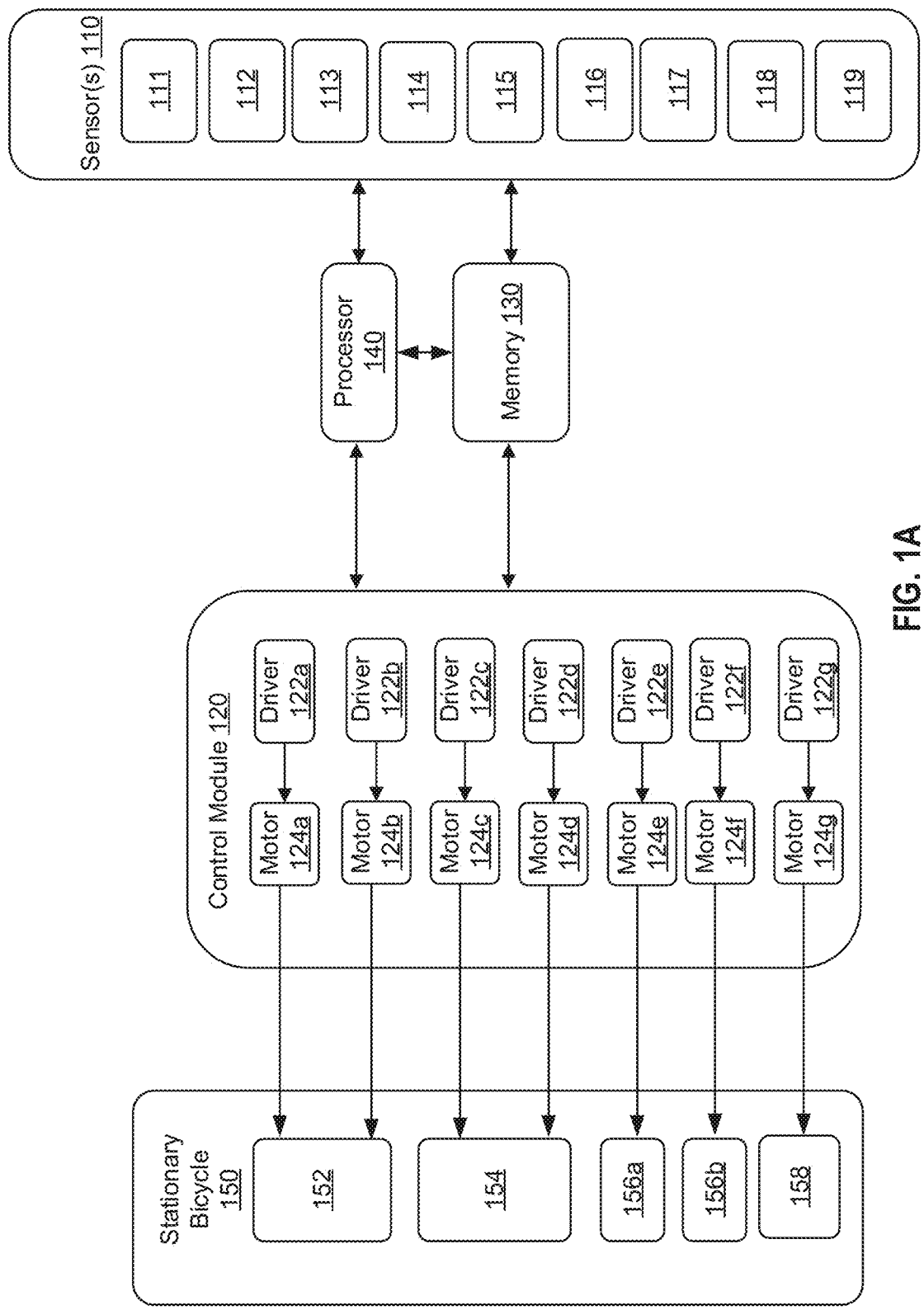
FIG. 1A illustrates an exemplary system for bicycle fitting, consistent with some embodiments of the present disclosure.

FIG. 1A is a block diagram which illustrates an exemplary system 100 for bicycle fitting, consistent with some embodiments of the present disclosure. In some embodiments, system 100 provides a fitting platform for determining a cyclist's preferred or suitable saddle and handlebar positions. The bicycle fitting system 100 may help evaluate or determine a rider's suitable bicycle geometry, including frame size, tire size, handlebar size, saddle fit, etc., as well as the rider's suitable riding position, riding behavior, riding or pedaling power efficiency, and handlebar and saddle (or seat post) positions and adjustments. Addition geometry factors that may be considered or evaluated may include one or more of factors such as seat tube length, seat tube angle, top tube length, head tube length, head tube angle, fork rake, trail, wheelbase, chain stay length, bottom bracket drop, stack, reach, stand over height, etc. The bicycle fitting system may also help evaluate, determine, fine tune, train, or fit a rider, professional cyclists or mountain bikers included, for races, competitions, triathlons, leisure rides, long distance rides, and various riding circumstances or challenges.

In some embodiments, system 100 includes one or more sensors 110, a control module 120, a memory device 130, a processor 140, and a stationary bicycle 150. In some embodiments, memory device 130 and processor 140 may be integrated in stationary bicycle 150. In some embodiments, memory device 130 and processor 140 may be included in a handheld, a tablet, a personal computer, a network PC, or a cloud server communicatively coupled to sensors 110, control module 120, and stationary bicycle 150.

Control module 120 may include one or more drivers 122a-122g and one or more corresponding motors 124a-124g. Bicycle 150 may include a bike frame with a saddle 152, a handlebar 154, incline adjusting units 156a, 156b and a resistance adjusting unit 158. Saddle 152 and handlebar 154 each may be configured to be movable, such as along an x-axis (e.g., the longitudinal direction), a y-axis (e.g., the vertical direction), or both. Depending on the configuration, the axis or axes of each's movement may be in any other direction, such as a diagonal or a direction that has an inclined angle from a horizontal line. Incline adjusting units 156a, 156b may be configured to adjust the incline level or ascent/descent angle to simulate different slopes of road conditions. Resistance adjusting unit 158 may be configured to adjust the riding resistance of stationary bicycle 150 to simulate different riding conditions.

Control module 120 may be configured to adjust the position of saddle 152 or handlebar 154 along one or more axes by motors 124a-124d. In some embodiments, control module 120 is further configured to actuate or dynamically actuate stationary bicycle 150 to simulate different cycling scenarios, such as road condition, the incline angle and the riding resistance of stationary bicycle 150, race or competition scenarios, turns, wind, drag, etc. Control module 120 may control or implement these various configurations use appropriate commands to corresponding motors 124e-124g.

Figure 1B:
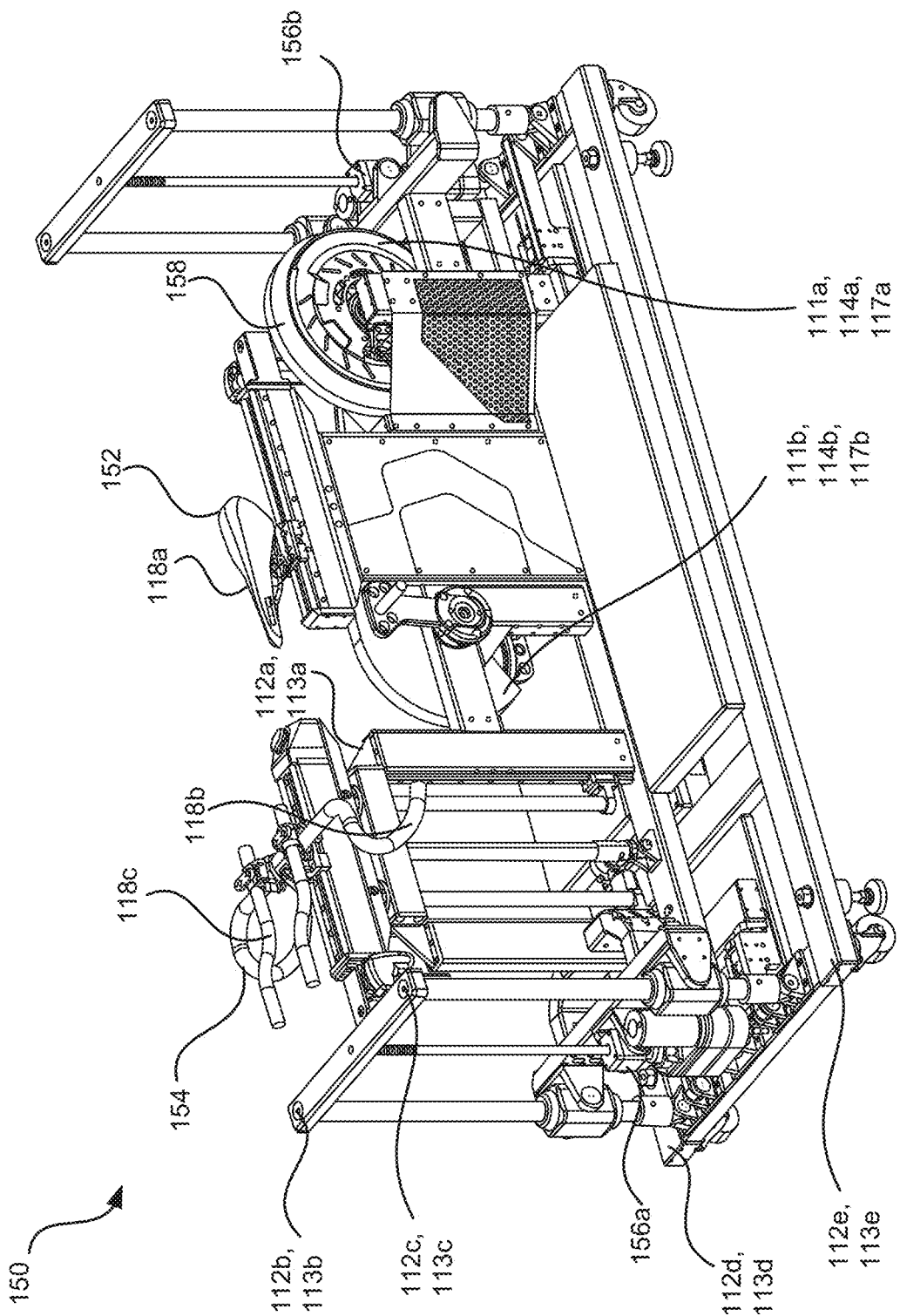
FIG. 1B and FIG. 1C illustrate perspective view and side view of an exemplary stationary bicycle, consistent with some embodiments of the present disclosure.
Figure 1C:
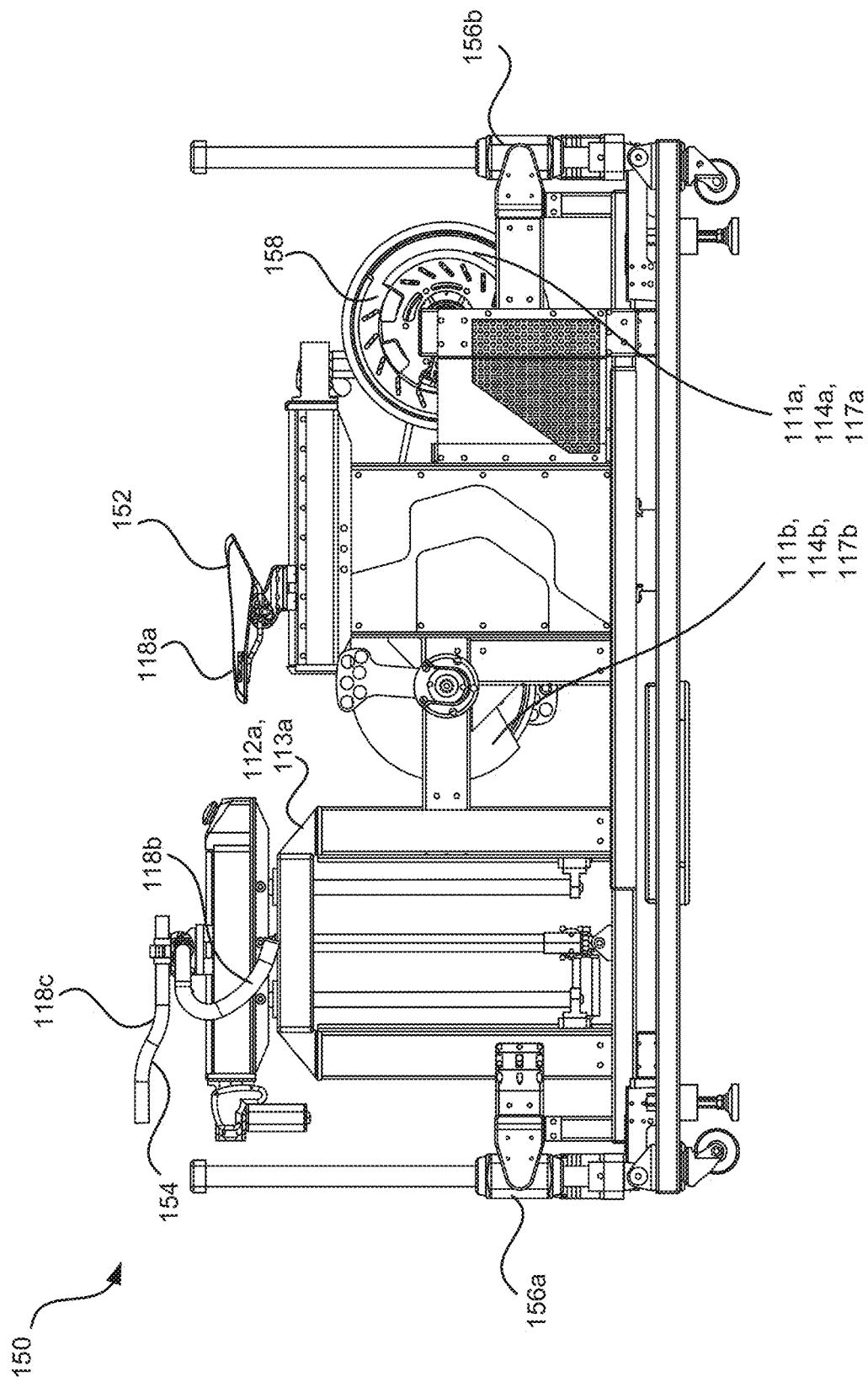

In some embodiments, sensors 110 may include one or more power sensors 111, one or more position sensors 112, one or more motion sensors 113, one or more speed sensors 114, one or more electromyography (EMG) sensors 115, one or more heart rate (HR) sensors 116, one or more cadence sensors 117, one or more pressure sensors 118, one or more respiratory sensors 119, and some other sensors. FIG. 1B and FIG. 1C are perspective view and side view of an exemplary stationary bicycle 150 consistent with some embodiments of the present disclosure. Sensors 110 can be mounted on respective locations on stationary bicycle 150, or, as appropriate mounted on a user riding on stationary bicycle 150.

As shown in FIGS. 1B and 1C, power sensor(s) 111a or 111b, speed sensor(s) 114a or 114b and cadence sensor(s) 117a or 117b can be mounted on the exercise wheel of resistance adjusting unit 158 or can be mounted on a surface of the crankset on stationary bicycle 150. Power sensor(s) 111a or 111b can choose from such as power meter(s) or other power sensor(s). Pressure sensor(s) 118a-118c can be mounted on saddle 152 or handlebar 154. Position sensor(s) 112a-112e and motion sensor(s) 113a-113e, such as charge-coupled device (CCD) or infrared camera devices, can be mounted on a surface, a tube, or any proper position on the platform base. In some embodiments, position sensor(s) 112a-112e and motion sensor(s) 113a-113e can also be achieved by one or more external camera, independent from exemplary stationary bicycle 150.

Figure 1D:
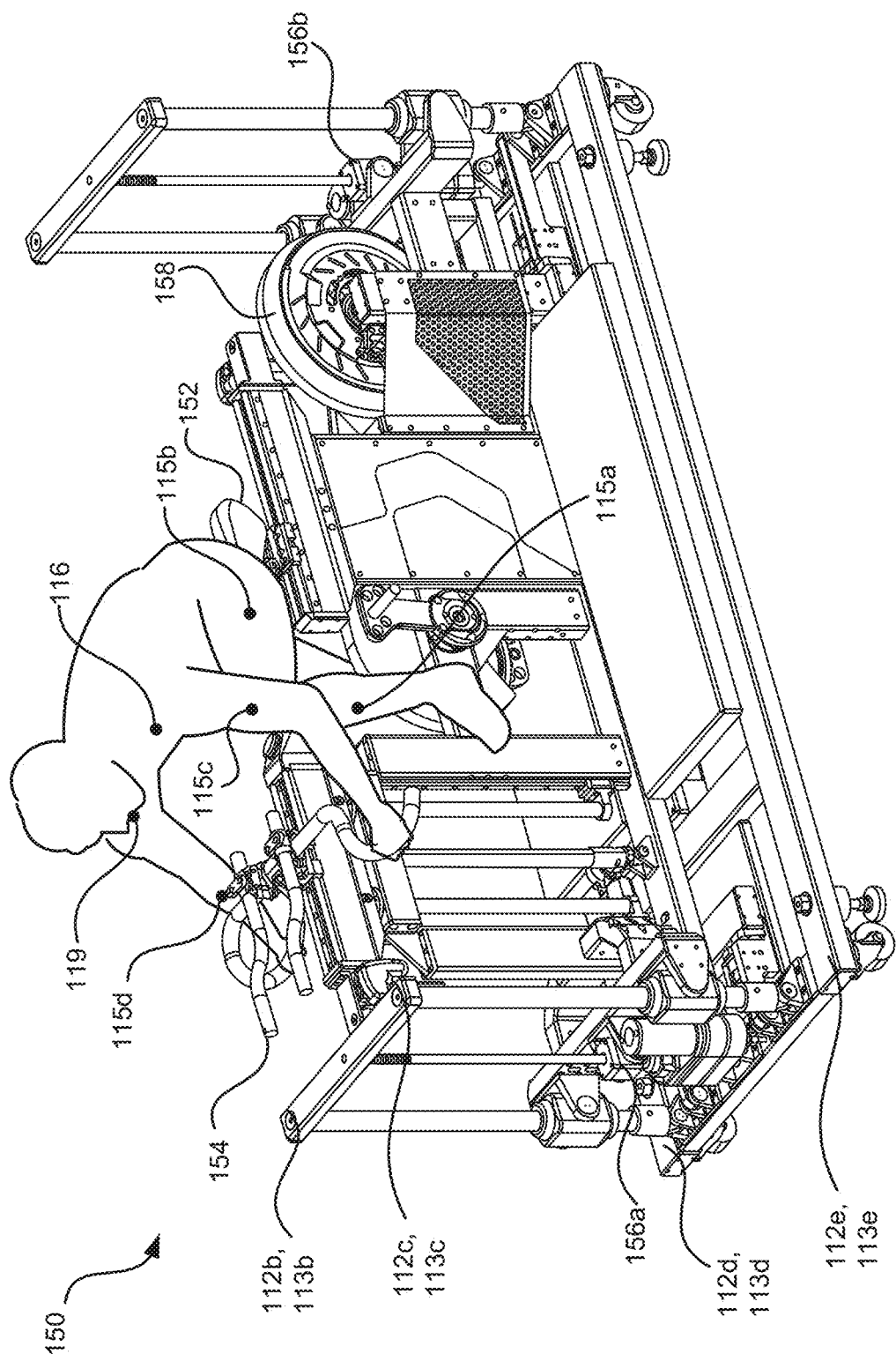
FIG. 1D and FIG. 1E illustrate a rider pedaling on the stationary bicycle of FIG. 1B and FIG. 1C, consistent with some embodiments of the present disclosure.
Figure 1E:
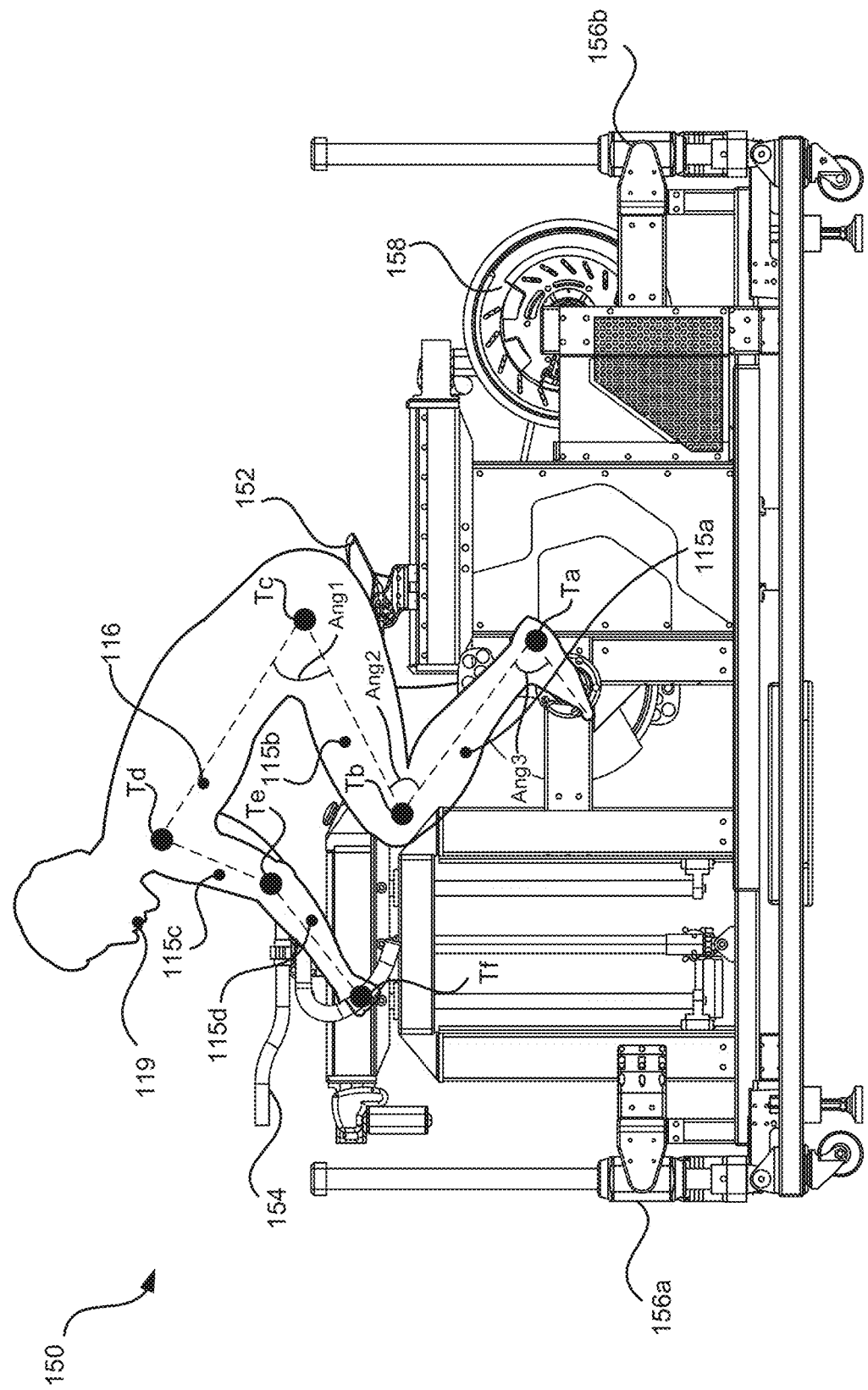

FIG. 1D and FIG. 1E illustrate a rider pedaling on exemplary stationary bicycle 150 of FIG. 1B and FIG. 1C, consistent with some embodiments of the present disclosure. As shown in FIGS. 1D and 1E, EMG sensor(s) 115a-115d can be attached to leg muscles or arm muscles of the rider, and HR sensors 116 can be attached to chest and wrist of the rider. Respiratory sensor(s) 119 can be incorporated within a breathing tube, a cannula, mask or other apparatus on or around the face of the rider. Sensing tag(s) Ta, Tb, Tc, Td, Te, Tf corresponding to position sensor(s) 112a-112e and motion sensor(s) 113a-113e can be attached to body joints (e.g., ankles, knees, hips, shoulders, elbows, and wrists) of the rider. Sensing tag(s) Ta, Tb, Tc, Td, Te, Tf can transmit optical or electromagnetic signals or reflect signals from the position sensor(s) 112a-112e and motion sensor(s) 113a-113e for identifying positions and movements of body joints during the pedaling.

Referring again to FIG. 1A, one or more sensors 110 can be configured to measure data. The measured data can be stored in a database in memory device 130. In addition, memory device 130 can store software instructions executed by processor 140 to perform operations consistent with the disclosed embodiments. For example, processor 140 can be configured to execute a set of instructions stored in memory device 130 to cause system 100 to perform a method for bicycle fitting when the user pedals on stationary bike 150 of system 100, which is discussed in detail below. It will be appreciated that examples described herein are exemplary and other means of establishing communication between sensors 110, control module 120, memory device 130, processor 140 and stationary bicycle 150 may be used. For example, in a networked environment, programmable code, application programs, software instructions, and databases may also be stored in remote computer(s) or cloud server(s). By executing instructions, processor 140 can perform various processing or calculations based on the data from sensors 110 to obtain various factors being used for evaluation. For example, these factors may include one or more mechanical efficiency factors, one or more biomechanical efficiency factors, and one or more user comfort factors, which will be discussed in detail in the following paragraphs. It would be appreciated that the evaluation factors identified herein are merely examples and not meant to limit the disclosure.

In some embodiments, system 100 can also obtain evaluation factors based on the images captured by one or more motion or body position or posture sensor(s) 113. In some embodiments, one or more motion or body position or posture sensor(s) 113 may include a camera configured to identify various parts of a user's or cyclist's body parts while she or he is riding. For example, sensor(s) 113 can identify the angle(s) (e.g., hip angle Ang1, knee angle Ang2, and ankle angle Ang3 shown in FIG. 1E) or range of motions at or near various joints (e.g., hip, knee, and ankle), deviations, if any, from ideal or present angles and ranges, abnormalities, etc.

Processor 140 may further process various parameters obtained by sensor(s) 113. For example, processor 140 may compare these parameters with different thresholds to see if these parameters fall within corresponding desired ranges, and accordingly determine the factors based on comparison results. It would be appreciated that these factors may also be obtained based on the data from sensors 110 and the data from sensor(s) 113. For ease of understanding, the processing or calculations of evaluation factors will be described in detail in the following paragraphs. It is noted that the calculations described below are merely examples and are not meant to limit the present disclosure.

In some embodiments, the mechanical efficiency factor can be calculated based on data from power sensor(s) 111, cadence sensor(s) 117, speed sensor(s) 114, and motion sensor(s) 113. Power sensor(s) 111 are configured to obtain the user's pedaling power. Motion sensor(s) 113 are configured to measure and obtain motion parameters such as the variations of body joint angles, such as ankle angles, knee angles, hip angles, shoulder angles, elbow angles, and wrist angles during the pedaling, and horizontal and vertical displacement of these body joints under different cadence values. Cadence sensor(s) 117 are configured to sense the cadence, i.e., revolutions per minute (rpm). Speed sensor(s) 114 are configured to sense the speed of bike, which can be computed based on the pedaling cadence and gear ratio.

Based on these data, processor 140 can calculate a ratio of the effective force to the resultant force and calculate how the speed correlate to power, which may indicate the user's riding efficiency. In some embodiments, the effective force refers to the force acting perpendicular to the crank arm, and the resultant force refers to the total force applied to the pedal.

Processor 140 can also determine whether the motion parameters fall within corresponding preferred ranges for the mechanical efficiency. In some embodiments, based on the experiment results, preferred ranges of maximum and minimum values of body joint angles can be stored in a database in memory device 130. For example, Table 1 below indicates exemplary preferred ranges for maximum and minimum values of body joint angles for the mechanical efficiency.

TABLE 1

| | Preferred Maximum Degree | Preferred Minimum Degree |
|---|---|---|
| Hip Angles | 84.6~91.2 | 39.1~47.2 |
| Knee Angles | 110.9~115.8 | 35.5~45.7 |
| Ankle Angles | 113.4~115.0 | 90.2~93.4 |

Accordingly, processor 140 can obtain a riding posture indicator by calculating a ratio of the number of motion parameters within the range to the total number of evaluated motion parameters. Then, processor 140 can determine the mechanical efficiency factor based on the obtained data, the calculation results, the riding posture indicator, or a combination thereof. In some embodiments, the mechanical efficiency factor may also be a pedaling efficiency determined based on inertial measurement unit (IMU) data from one or more IMU sensors attached on the rider during the fitting process. For example, the one or more IMU sensors can be mounted on appropriate position(s) of one or more rider gears during the fitting process. The rider gears may include helmets, cycling goggles, cycling jackets, cycling pants, cycling gloves, cycling shoes/boots or any other accessories for the rider.

In some embodiments, the biomechanical efficiency factor can be calculated based on data from power sensor(s) 111, EMG sensor(s) 115, heart rate sensor(s) 116, respiratory sensor(s) 119 and motion sensor(s) 113. EMG sensor(s) 115 and heart rate sensor(s) 116 are configured to detect the EMG amplitude and the heart rate of the user during pedaling. Respiratory sensor(s) 119 are configured to detect the oxygen intake or respiration rate of the user. In addition, in some embodiments, respiratory sensor(s) 119 can further be configured to identify the user's workout state during pedaling. For example, respiratory sensor(s) 119 can be used to indicate whether the user's respiration is aerobic or anaerobic.

Based on these data, processor 140 can calculate the effective force divided by EMG amplitude, calculate the power output divided by heart rate, calculate the power output divided by oxygen uptake, and calculate the oxygen uptake divided by heart rate. Then, processor 140 can determine the biomechanical efficiency factor based on the obtained data, the calculation results, the riding posture indicator, the energetic system applied, or a combination thereof. For example, in some embodiments, the biomechanical efficiency factor may be a pedaling efficiency defined as the effective force divided by EMG amplitude. In some embodiments, the biomechanical efficiency factor may be a pedaling efficiency determined based on IMU data from one or more IMU sensors attached on the rider or mounted on one or more rider gears during the fitting process.

Processor 140 can also determine whether the motion parameters fall within corresponding preferred ranges for the biomechanical efficiency. For example, Table 2 and Table 3 below respectively indicate exemplary preferred ranges for maximum and minimum values of body joint angles for the electromyogram amplitude and for the biomechanical efficiency.

TABLE 2

| | Preferred Maximum Degree | Preferred Minimum Degree |
|---|---|---|
| Hip Angles | 82.3~84.7 | 35.8~40.3 |
| Knee Angles | 105.5~115.8 | 25.9~45.7 |
| Ankle Angles | 113.3~115.0 | 82.2~93.4 |

TABLE 3

| | Preferred Maximum Degree | Preferred Minimum Degree |
|---|---|---|
| Hip Angles | 84.6~89.8 | 39.1~44.8 |
| Knee Angles | 110.9~115.8 | 35.5~45.7 |
| Ankle Angles | 113.3~115.0 | 90.2~93.4 |

In some embodiments, the user comfort factor can be calculated based on data from EMG sensor(s) 115, heart rate sensor(s) 116, pressure sensor(s) 118 and a comfort questionnaire based on the user's feedback.

The pressure sensor(s) 118 are configured to detect the pressure on the saddle or on the handlebar. For example, the pressure sensor(s) 118 may provide information including the peak pressure value, distribution and area of the pressure on the saddle or on the handlebar, pressure values of specific positions on the saddle or on the handlebar, etc. Based on these data, processor 140 can calculate the pressure value per unit area. Then, processor 140 can determine the user comfort factor based on the obtained data including saddle pressure or handlebar pressure, heart rate, EMG amplitude, the calculation results, the riding posture indicator, the comfort questionnaire, or any combination thereof.

Processor 140 can also determine whether the motion parameters fall within corresponding preferred ranges for the comfortableness. For example, Table 4 below indicates exemplary preferred ranges for maximum and minimum values of body joint angles for the comfortableness.

TABLE 4

| | Preferred Maximum Degree | Preferred Minimum Degree |
|---|---|---|
| Hip Angles | 82.3~87.0 | 35.8~40.2 |
| Knee Angles | 105.5~110.9 | 25.9~35.5 |
| Ankle Angles | 112.8~113.4 | 82.2~90.2 |

In some embodiments, processor 140 can apply a standardization process when calculating these evaluation factors. Then, processor 140 can calculate an overall score based on the standardized evaluation factors. In some embodiments, the standardized evaluation factors are multiplied by respective weights in order to calculate the overall score. Weights for the evaluation factors may be varied based on one or more scenario parameters selected or identified by the user or the trainer. For example, scenario parameters may include a riding duration parameter, a riding performance parameter, an injure parameter, a circumstance parameter, a fitness parameter, etc.

In some embodiments, the riding duration parameter may include a riding period of time or a riding distance. The riding performance parameter may include an estimated speed or power of riding. The injure parameter may include the type of injury and the body part injured. The circumstance parameter may include the weather condition, such as estimated wind resistance, temperature or humidity, and the route condition, such as the uphill and downhill or road surface quality (e.g., paved surface, unpaved trails, gravel, grass, or a mixed combination thereof). The fitness parameter may include a rider's personal physical fitness evaluation.

For example, when performing fitting for a first rider, the trainer may, via a user interface such as a keyboard, a mouse, a touch screen, buttons of a computing device, etc., set a first scenario of riding at the speed of 20 kilometers per hour at a 2-percent (i.e., 2%) incline for 50 kilometers, with the wind speed of 20 kilometer per hour, and identify that the first rider had injuries of the right knee and the first rider's flexibility and fitness condition is relatively poor. Accordingly, processor 140 can set or calculate the weights of the evaluation factors for the first scenario based on these scenario parameters.

For example, under the first scenario, by sending proper commands to corresponding motor(s) 124e-124f, processor 140 can adjust the incline level of the stationary bike to 2%. In addition, based on historical data, experimental results, computer simulations or AI-based analysis, processor 140 may determine that the biomechanical efficiency is the most significant factor, and the user comfort is the least significant factor. Accordingly, the weight for the mechanical efficiency factor is configured as 0.3, the weight for the biomechanical efficiency factor can is configured as 0.5, and the weight for the user comfort factor is configured as 0.2.

The processor 140 can use the ratio of the speed to the effective force as the mechanical efficiency factor, the power output per heart rate as the biomechanical efficiency factor, and the peak pressure value of the saddle as the user comfort factor accordingly. Then, after the standardization process, the score for each sample position can be obtained by the weighted sum of the standardized factors.

For another example, when performing fitting for a second rider, the trainer may, via the user interface such as a laptop or a smart phone, set a second scenario of riding at the speed of 30 kilometers per hour at a flat road for 50 kilometers with the wind speed of 10 kilometer per hour, and identify that the second rider had no history of the injury and the second rider's flexibility and fitness condition is relatively good. Accordingly, processor 140 can set or calculate the weights of the evaluation factors for the second scenario based on these scenario parameters. Thus, processor 140 can perform personalized fitting based on the specific conditions for the rider or provide different fitting settings corresponding to different bike routes or different weather conditions for the same rider.

Under the second scenario, processor 140 may determine that the user comfort is the most significant factor, while the mechanical efficiency and the biomechanical efficiency are less significant. Accordingly, the weight for the mechanical efficiency factor is configured as 0.2, the weight for the biomechanical efficiency factor is configured as 0.2, and the weight for the user comfort factor is configured as 0.6.

The processor 140 can use the ratio of the effective force to the resultant force as the mechanical efficiency factor, the power output per EMG amplitude as the biomechanical efficiency factor, and a subjective comfort score inputted by the user can be applied as the user comfort factor accordingly. Then, after the standardization process, the score for each sample position can be obtained by the weighted sum of the standardized factors.

It is noted that various indicators can be used as the evaluation factors, based on which sensors are installed in system 100. For example, processor 140 may initially determine the weight for the mechanical efficiency factor being 0.3, the weight for the biomechanical efficiency factor being 0.5, and the weight for the user comfort factor being 0.2. In a system 100 having a power sensor 111 and motion sensor(s) 113, the mechanical efficiency factor can be the ratio of the effective force to the resultant force, and the biomechanical efficiency factor can be the riding posture indicator. In addition, the weights for the mechanical efficiency factor and the biomechanical efficiency factor can be adjusted in scale to 0.375 and 0.625 respectively if there is no a proper indicator can be obtained as the user comfort factor (e.g., the weight for the user comfort factor can be setting to 0) based on the sensors in system 100.

In various embodiments, corresponding weights discussed above can be determined using various methods. For example, a mapping table can be stored in memory device 130 to determine corresponding weight for each evaluation factor based on the scenario parameters provided by the user. Alternatively stated, different weighting combinations for the evaluation factors can be stored in a database in memory device 130. Accordingly, processor 140 can access the database to select the weighting combination matching the scenario parameters to determine the corresponding weights. In some other embodiments, various Artificial Intelligence (AI) or Machine Learning (ML) algorithms, or experimental results applying Big Data Analytics can be integrated to determine corresponding weight for each evaluation factor.

Accordingly, system 100 can calculate the overall score for the user riding at a specific saddle position. During the fitting process, system 100 can adjust the saddle position along both the x-axis and the y-axis and repeat the sensing operations and calculation, in order to obtain corresponding scores at different positions in sequence to determine a suitable or optimized saddle position for the user. Similarly, in some embodiments, system 100 can perform similar operations to determine a suitable or optimized handlebar position for the user.

Figure 2A:
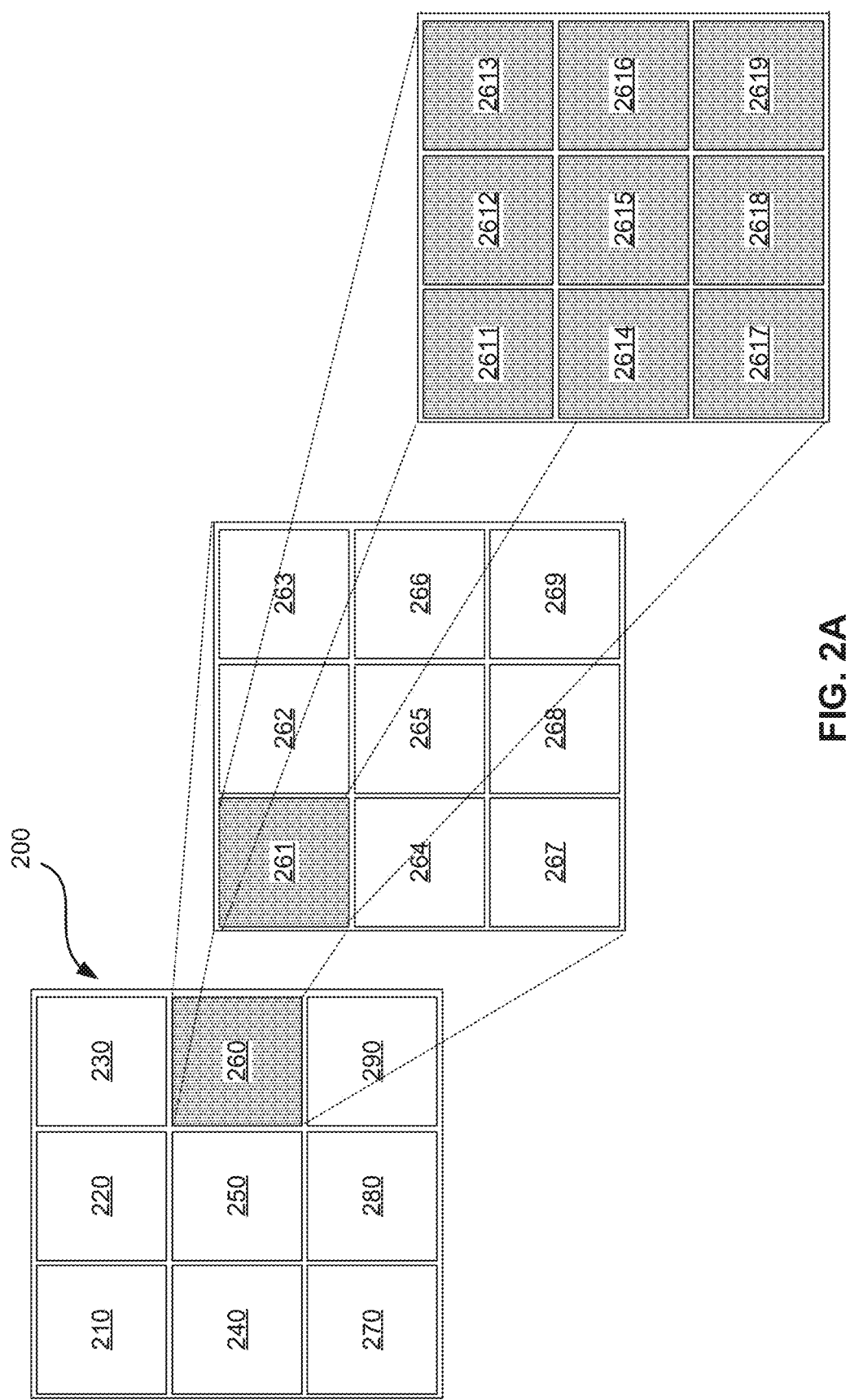
FIG. 2A illustrates an exemplary iterative process for bicycle fitting, consistent with some embodiments of the present disclosure.

Reference is made to FIG. 2A, which illustrates an exemplary iterative process for bicycle fitting consistent with some embodiments of the present disclosure. As shown in FIG. 2A, in some embodiments, system 100 can optimize the saddle position by an iterative process. In the first iteration, a possible area 200 for adjustment is divided into a 3×3 matrix including nine candidate regions (e.g., regions 210-290 for the top-left, top, top-right. middle-left, middle, middle-right, bottom-left, bottom, and bottom-right regions). For example, saddle 152 may be movable within a 45 mm×45 mm square region, along the longitudinal direction or the vertical direction, and each of regions 210-290 is a 15 mm×15 mm square. In some embodiments, saddle 152 may be movable within a 100 mm×100 mm square region. By adjusting the saddle position during the user's pedaling, the system 100 is configured to obtain the evaluation factors and calculate the weighted score accordingly at the center position of each regions 210-290. By comparing the scores of regions 210-290, system 100 can identify the middle-right region 260 having the highest score as the selected region.

Then, system 100 can again divide the selected region (e.g., region 260) into nine candidate sub-regions (e.g., sub-regions 261-269 for the top-left, top, top-right. middle-left, middle, middle-right, bottom-left, bottom, and bottom-right regions). For example, each of sub-regions 261-269 is a 5 mm×5 mm square. Similarly, the system 100 is configured to obtain the evaluation factors and calculate the weighted score accordingly at the center position of each sub-regions 261-269. By comparing the scores of sub-regions 261-269, system 100 can identify the top-left sub-region 261 having the highest score as the selected region. In some embodiments, the iterative process described above can be repeated numerous times until an optimal saddle position is found. For example, if the scores at the center position of all sub-regions 2611-2619 in sub-region 261 are substantially the same or within a threshold range (e.g., ±1%, ±5%, ±10%, etc.), system 100 can terminate the iterative process, and configure the center position of sub-region 261 (e.g., the center position of sub-region 2615) as the optimal saddle position. In some other embodiments, the iterative process described above can also be terminated if the size of the sub-regions in the current iteration cycle reaches a threshold value (e.g., 3 mm×3 mm).

The operations discussed above may also be applied to determine an optimized handlebar position, by adjusting the handlebar positions and calculating the corresponding scores. Alternatively stated, system 100 can first determine the optimized saddle position, and then perform similar iterative process to determine the optimized handlebar position. In some other embodiments, system 100 may also determine the optimized handlebar position first, and then perform similar iterative process to determine the optimized saddle position.

It is noted that the embodiment in FIG. 2A is merely an example and not meant to limit the disclosure. It will be apparent to those skilled in the art that various modifications and variations can be made in the iterative process. For example, in some embodiments, the numbers of candidate regions and the shapes thereof may be modified based on different configurations. For example, a candidate area of interest for any iteration cycle can be divided into an M×N matrix with M and N being any integers or into different types of polygon shapes, such as triangular sub-regions or hexagonal sub-regions.

Figure 2C:
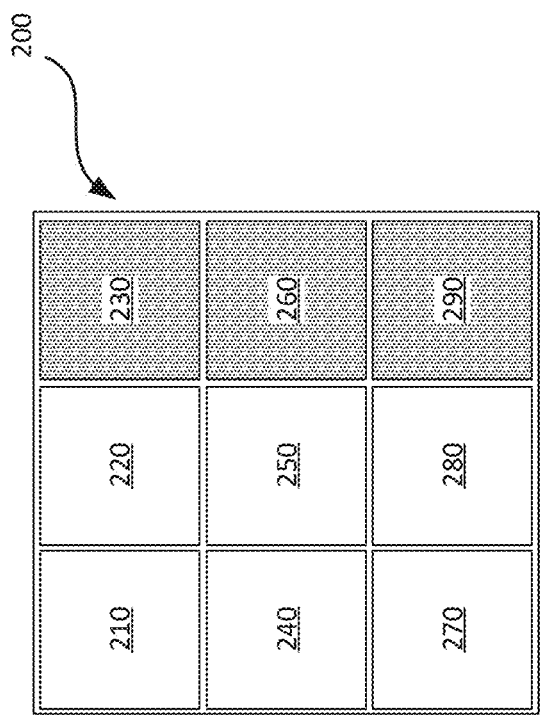
FIGS. 2B-2E respectively illustrate whether the motion parameters fall within corresponding preferred ranges, consistent with some embodiments of the present disclosure.
Figure 2B:
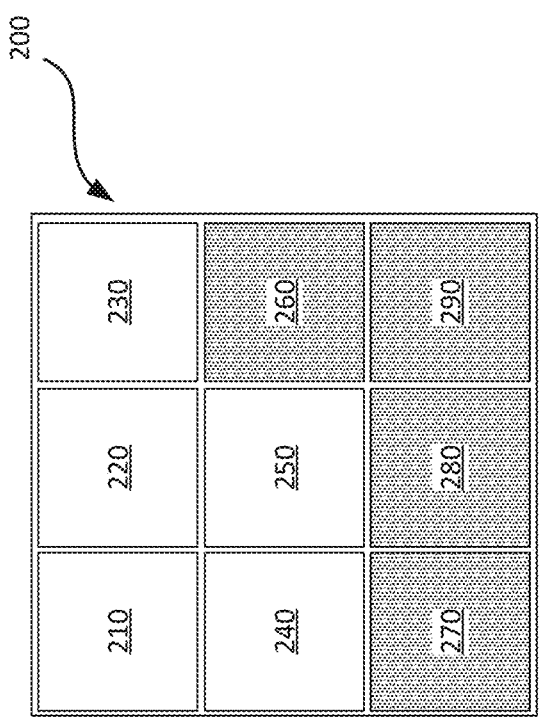
Figure 2E:
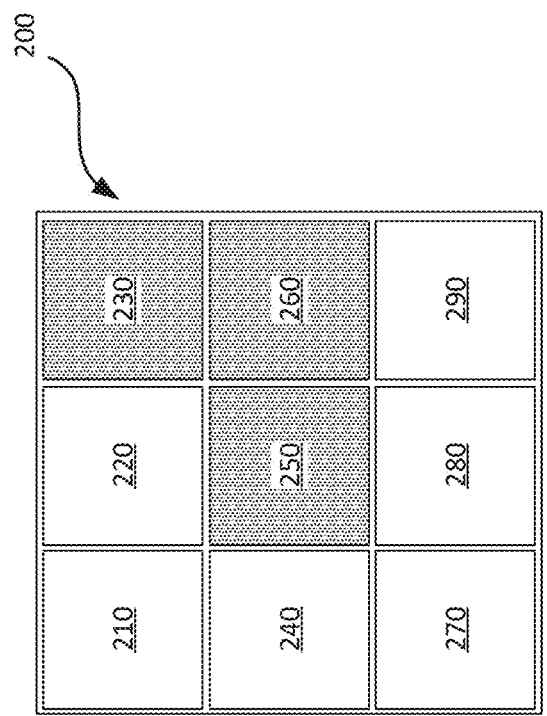
Figure 2D:
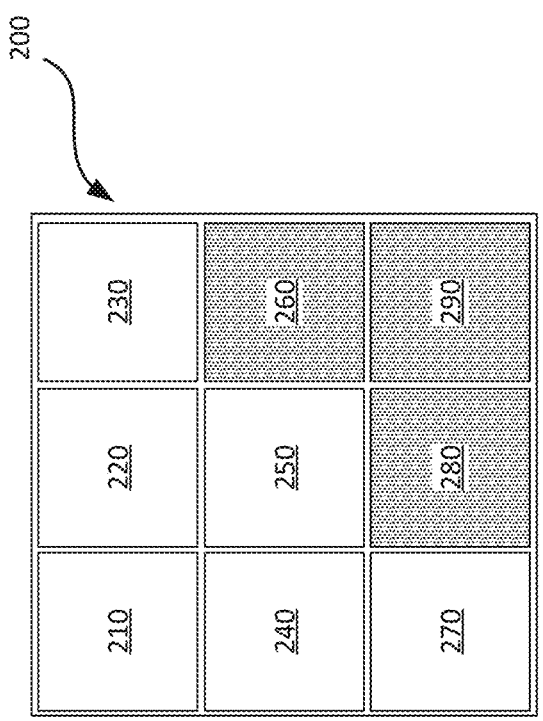

Reference is made to FIGS. 2B-2E, which respectively illustrate whether the motion parameters fall within corresponding preferred ranges for the mechanical efficiency, the electromyogram amplitude, the biomechanical efficiency, and the comfortableness when the saddle 152 or handlebar 154 is positioned at candidate regions, consistent with some other embodiments of the present disclosure. As shown in FIG. 2B, regions 260, 270, 280, and 290 are regions which satisfy the preferred ranges for the mechanical efficiency. As shown in FIG. 2C, regions 230, 260, and 290 are regions which satisfy the preferred ranges for the electromyogram amplitude. As shown in FIG. 2D, regions 260, 280, and 290 are regions which satisfy the preferred ranges for the biomechanical efficiency. As shown in FIG. 2E, regions 230, 250, and 260 are regions which satisfy the preferred ranges for the user comfort. Accordingly, by taking these factors into consideration, system 100 can also identify the middle-right region 260 as the selected region by evaluating data measured by position sensor(s) 112 and motion sensor(s) 113. By repeating the iterative process described above, system 100 can optimize the saddle position or the handlebar position.

Figure 3:
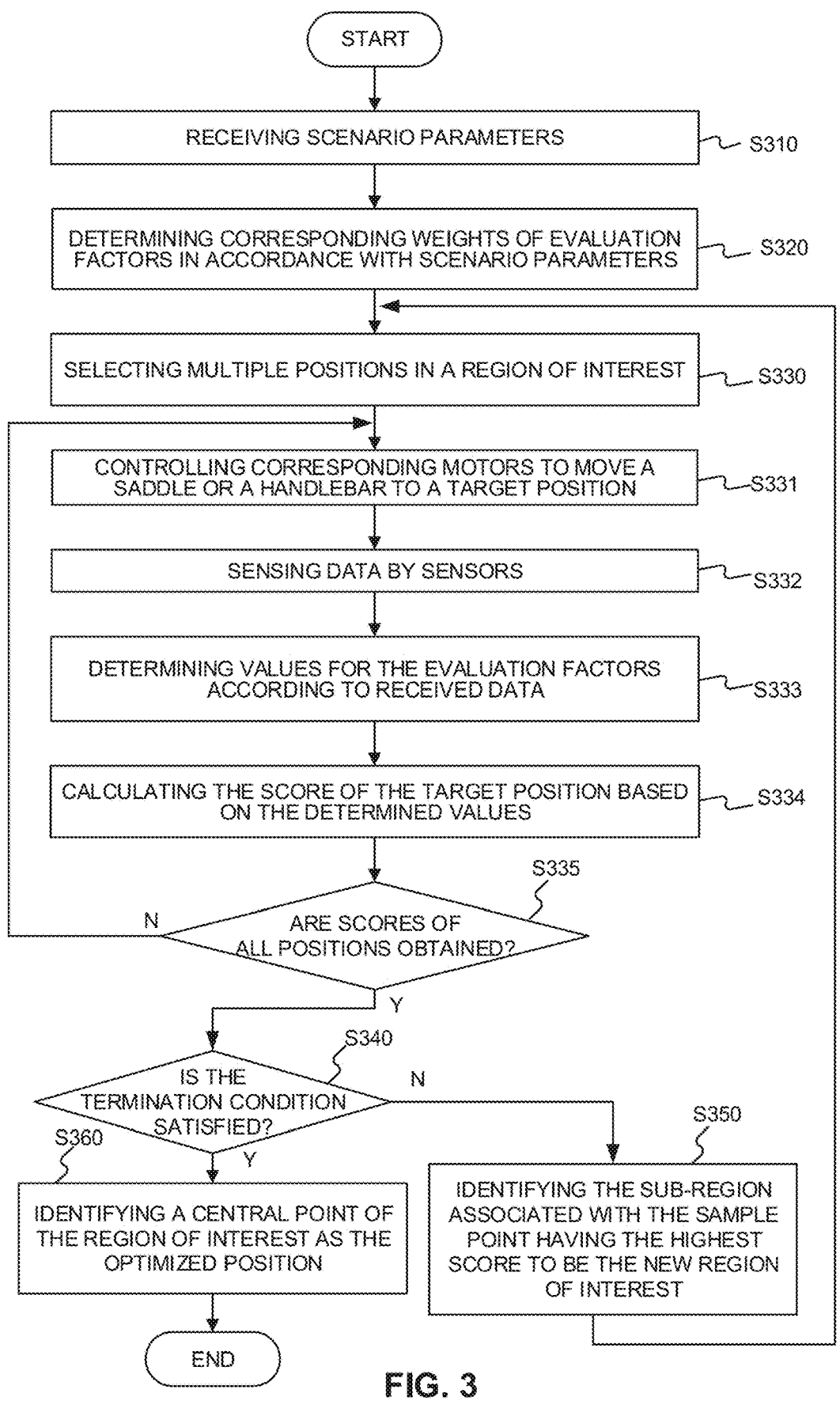
FIG. 3 is a flowchart illustrating an exemplary method or process for bicycle fitting, consistent with some embodiments of the present disclosure.

Reference is made to FIG. 3, which is a flowchart of an exemplary method 300 for bicycle fitting, consistent with some embodiments of the present disclosure. Method 300 can be performed by a bicycle fitting system (e.g., system 100 in FIG. 1A), but the present disclosure is not limited thereto. In some embodiments, processor 140 can be configured to execute instructions stored in memory device 130 to cause system 100 to perform steps of method 300 for bicycle fitting.

In step S310, processor 140 receives scenario parameters, which may include information associated with riding duration, riding performance, injure parameter, riding circumstance, fitness information of the user, or a combination thereof, provided by the rider or the trainer via a user interface.

In step S320, processor 140 determines corresponding weights of evaluation factors in accordance with the received scenario parameters. In some embodiments, the evaluation factors include a factor associated with a mechanical efficiency of pedaling, a factor associated with a biomechanical efficiency of pedaling, or a user comfort factor associated with a comfortableness of the user during pedaling.

In some embodiments, multiple weighting combinations for the evaluation factors can be stored in a database. Processor 140 can access the database to select the weighting combination matching the one or more scenario parameters to determine the corresponding weights.

In step S330, processor 140 selects multiple positions in a region of interest. For example, processor 140 may divide the region of interest into sub-regions and select corresponding sample points within the sub-regions to be the selected positions. In some embodiments, processor 140 may divide the region of interest into an M×N matrix, M and N being any integers. Each cell (e.g., regions 210-290 in the first iteration, sub-regions 261-269 in the second iteration, or sub-regions 2611-2619 in the third iteration in FIG. 2A) of the M×N matrix includes one of the sample points.

In step S331, processor 140 controls corresponding motors 124a-124d to move a saddle or a handlebar to a target position when a user is pedaling. In step S332, when the saddle or the handlebar is positioned at the target position, sensors 110(s) sense and provide data to processor 140. In some embodiments, the sensors 110 include a power sensor 111, a cadence sensor 117, a position sensor 112, a motion sensor 113, a speed sensor 114, an electromyography sensor 115, a heart rate sensor 116, a pressure sensor 118, a respiratory sensor 119, an IMU sensor (not shown in FIG. 1A), or any combination thereof. In step S333, processor 140 determines values for the evaluation factors according to received data. In step S334, processor 140 calculates the score of the target position based on the determined values.

In step S335, processor 140 determines whether scores of all positions are calculated. If not (step S335-no), the steps S331-S334 are repeatedly performed until the scores of all selected positions are calculated. Then, if all selected positions are calculated (step S335-yes), in steps S340-S360, processor 140 identifies an optimized sub-region or position in accordance with the scores.

For example, in step S340, processor 140 determines whether scores of all positions are substantially the same or within a threshold range (e.g., ±1%, ±5%, ±10%, etc.). If not (step S340-no), in step S350, processor 140 identifies the sub-region associated with the sample point having the highest score to be the new region of interest. Steps S330-S350 can be performed in multiple iteration cycles, until the scores of the sample points in the current iteration cycle are substantially the same or within the threshold range.

Accordingly, if scores of all positions are substantially the same (step S340-yes) or within the threshold range, in step S360, processor 140 identifies a central point of the region of interest in the current iteration cycle as the optimized position. By the iterative process described above, processor 140 can identify the optimized position from multiple positions in accordance with the calculated scores.

By applying method 300 for bicycle fitting, an automatic fitting process can be achieved. The bicycle fitting system can receive accurate data from the sensors and perform calculations accordingly to obtain suitable parameters for fitting evaluation. Compared to traditional bicycle fitting procedures, which heavily based on fitters' experiences and personal judgement, bicycle fitting systems disclosed in the present discourse provide a standard operating procedure. Accordingly, the time for training fitters can be reduced, and the consistency of the results can be guaranteed for fittings performed by different fitters. In addition, the simplified and automated fitting process can also reduce the fitting time required, lower the error caused by manual process, and improve the accuracy. Thus, a more effective and efficient bicycle fitting can be achieved.

Figure 4A:
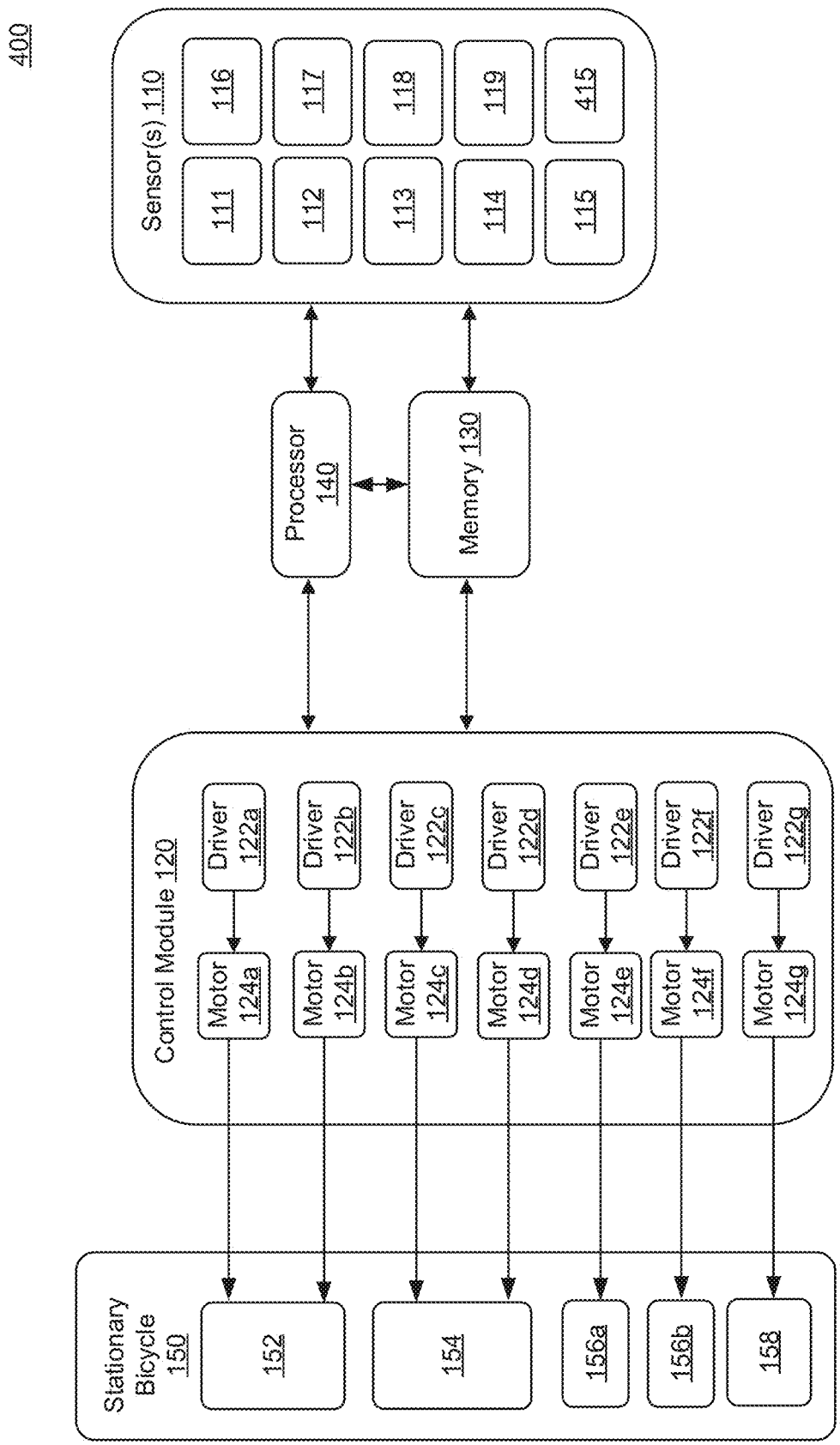
FIG. 4A illustrates another exemplary system for bicycle fitting, consistent with some embodiments of the present disclosure.

FIG. 4A is a block diagram which illustrates an exemplary system 400 for bicycle fitting, consistent with some embodiments of the present disclosure. Compared to system 100 in FIG. 1A, in system 400, sensor(s) 110 further include one or more inertial measurement unit (IMU) sensor(s) 415, which can be mounted on a user riding on stationary bicycle 150.

Figure 4B:
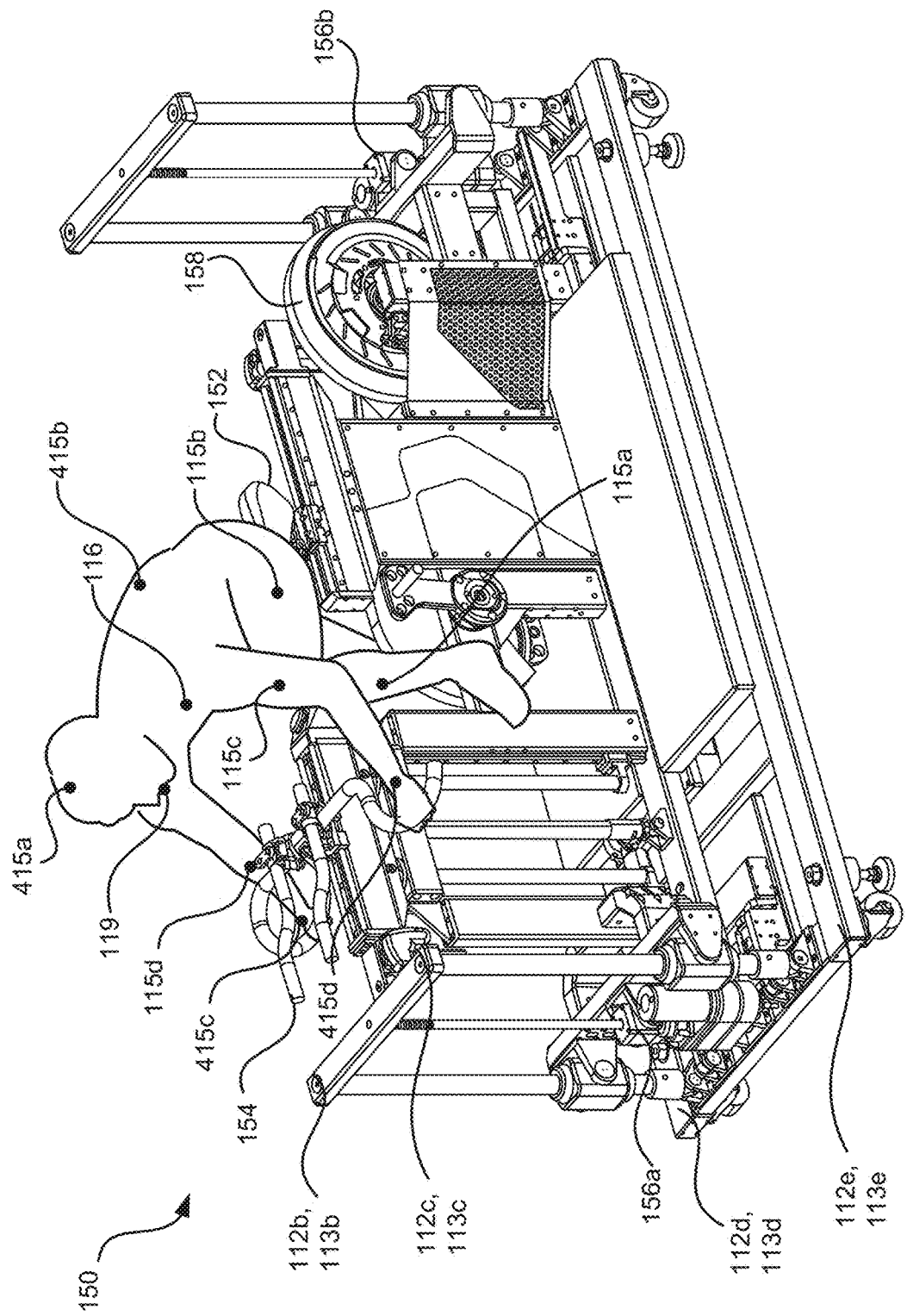
FIG. 4B and FIG. 4C illustrate a rider pedaling on the stationary bicycle, consistent with some embodiments of the present disclosure.
Figure 4C:
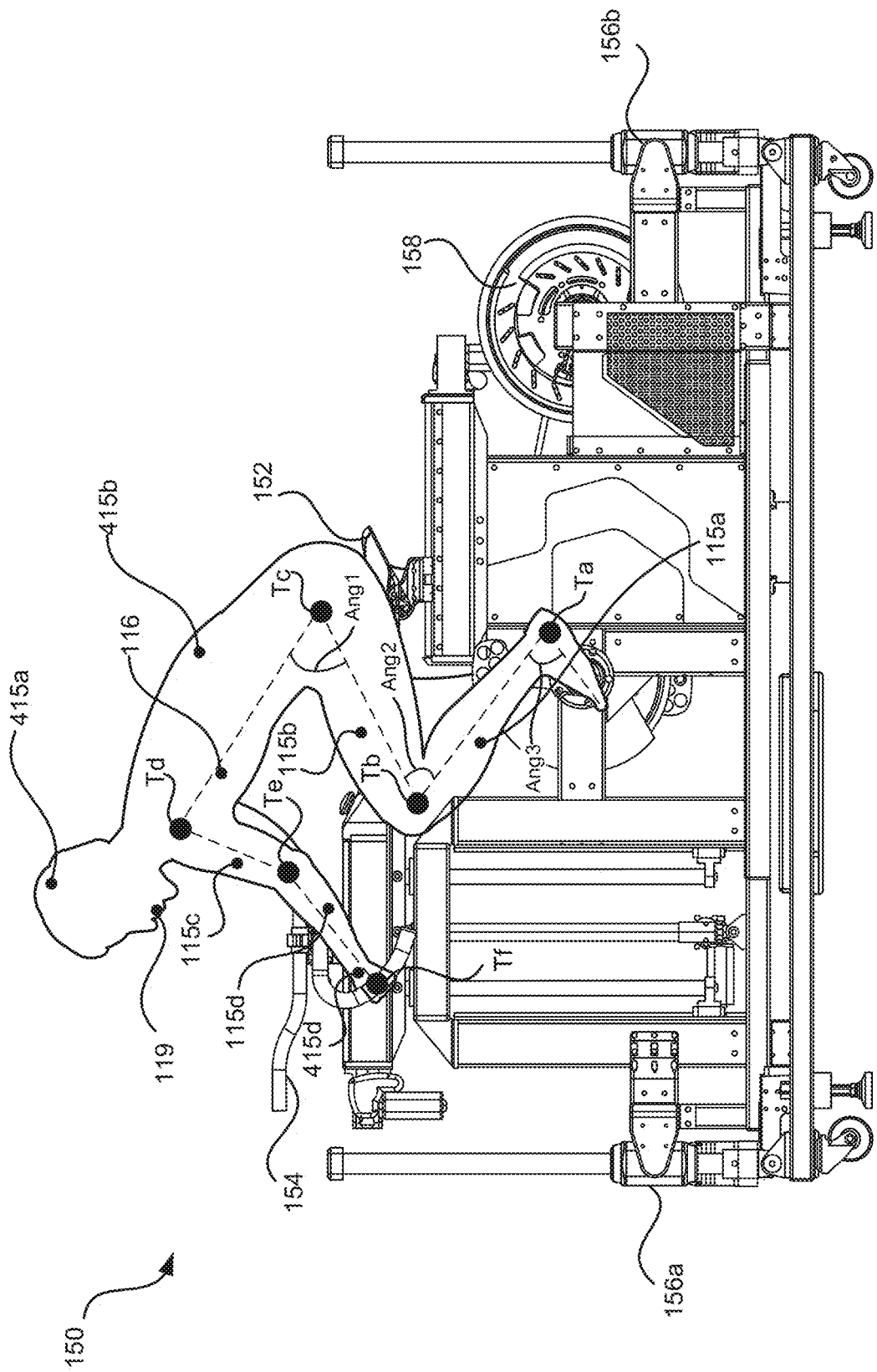

FIG. 4B and FIG. 4C illustrate a rider pedaling on exemplary stationary bicycle 150 of FIG. 1B and FIG. 1C, consistent with some embodiments of the present disclosure. As shown in FIGS. 4B and 4C, in some embodiments, one or more IMU sensor(s) 415a-415d can be attached to the head, back, hands (at positions adjacent to the handlebar 154), and/or shoulders of the rider for measuring the movements of the rider during the pedaling. As explained above, IMU sensors 415a-415d can be mounted on one or more appropriate position(s) of one or more rider gears, such as helmets, cycling goggles, cycling jackets, cycling pants, cycling gloves, cycling shoes/boots or any other accessories, for the rider. For example, IMU sensor 415a may be mounted on a helmet of the rider to detect the head movement. IMU sensor 415b may be mounted on a cycling jacket of the rider to detect the body movement. IMU sensors 415c and 415d may be mounted on cycling gloves of the rider to detect the hand movement.

Accordingly, IMU sensor(s) 415a-415d can be configured to detect the deviation or the lateral movements or shakings of the rider's body and obtain corresponding data. In some embodiments, the obtained data can be transmitted via wireless communication and stored in a database in memory device 130 of system 400 shown in FIG. 4A. In some embodiments, IMU sensors 415a-415d are the sensors used in method 300 for bicycle fitting in FIG. 3. For example, in step S332 of method 300, IMU sensors 415a-415d can sense and provide IMU data to processor 140, so that processor 140 can determine values for the evaluation factors according to received IMU data in step S333. As mentioned above, one or more of the evaluation factors, such as the biomechanical efficiency factor or the mechanical efficiency factor, may be determined based on the obtained IMU data during the fitting process.

Figure 5C:
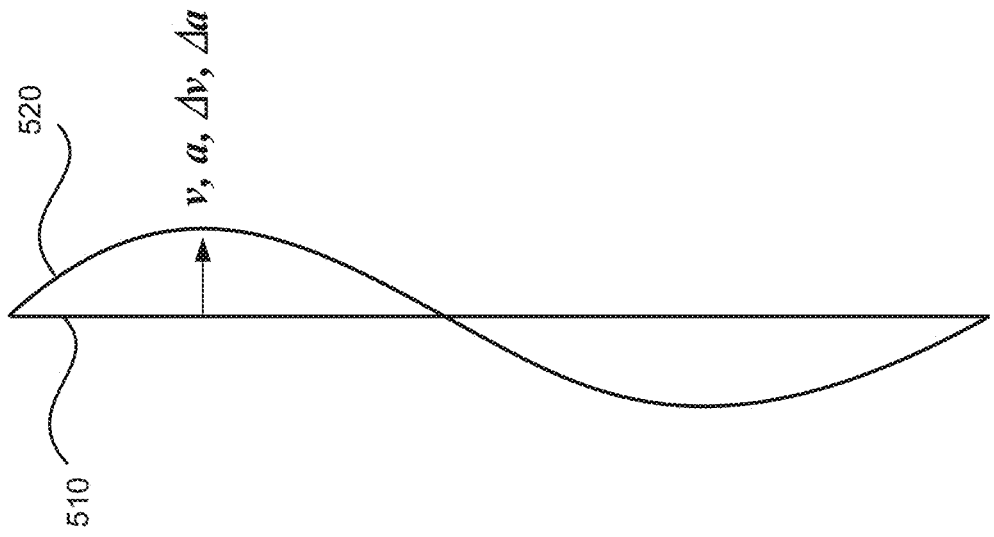
FIG. 5A, 5B and FIG. 5C respectively illustrate exemplary parameters for evaluating the riding efficient of the rider, consistent with some embodiments of the present disclosure.
Figure 5B:
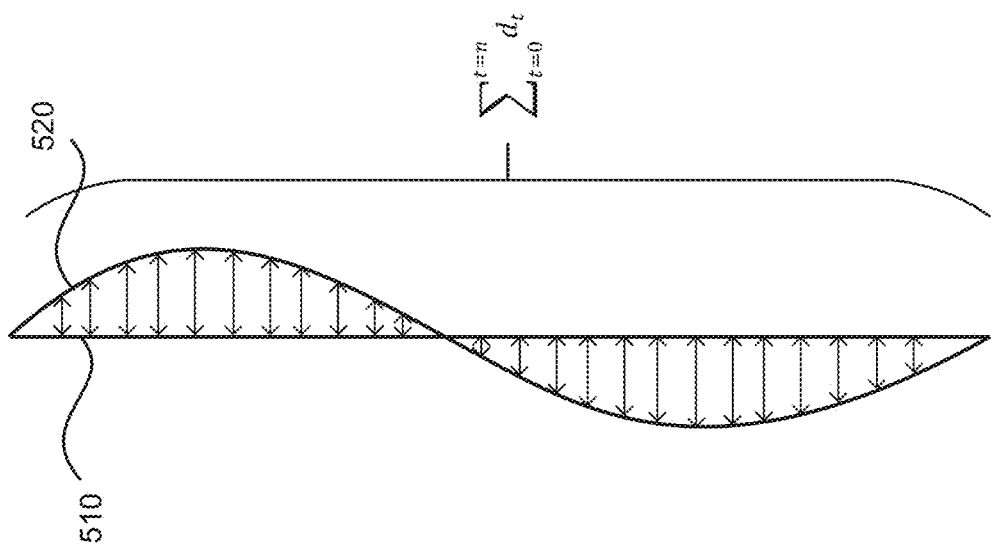
Figure 5A:
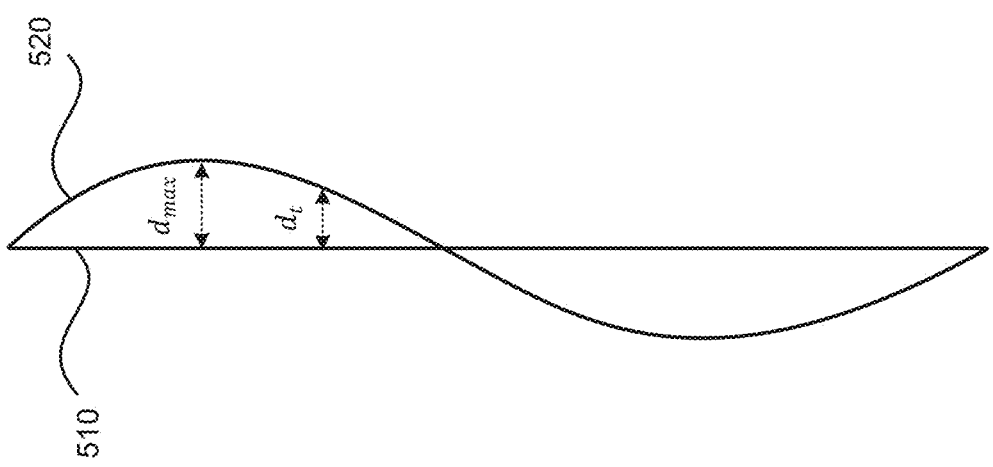

FIG. 5A, FIG. 5B and FIG. 5C respectively illustrate exemplary parameters obtained by IMU sensor(s) 415a-415d, consistent with some embodiments of the present disclosure. Parameters shown in FIG. 5A, FIG. 5B and FIG. 5C can be used for evaluating the riding efficient of the rider. For example, as shown in FIG. 5A, a temporal displacement value $d_t$ and a maximum displacement value $d_{max}$ of the movement of the rider can be computed and obtained by the measure data (e.g., a curved line 520 indicating the deviation/movement with respect to a reference axis 510) detected by IMU sensor(s) 415a-415d. As shown in FIG. 5B, an accumulated displacement value $\Sigma_{t=0}^{t=n}$ of the movement of the rider can also be computed and obtained by the measure data detected by IMU sensor(s) 415a-415d. As shown in FIG. 5C, a velocity value v, an acceleration value a, a change-in-velocity value $\Delta v$, and/or an change-in-acceleration value $\Delta a$ of the movement of the rider can also be computed and obtained by the measure data detected by IMU sensor(s) 415a-415d.

By these parameters, the pedaling efficient of the rider can be evaluated accordingly. In some embodiments, the biomechanical efficiency factor and/or the mechanical efficiency factor can be calculated based on data from IMU sensor(s) 415a-415d. For example, less deviation of the rider's body indicates less power loss during the pedaling and improved biomechanical efficiency factor and/or the mechanical efficiency factor.

By receiving the measure data detected by IMU sensor(s) 415a-415d and stored in memory device 130, processor 140 can determine biomechanical efficiency factor and/or the mechanical efficiency factor based on the obtained data, and then perform the iterative process discussed above to optimize the saddle position or the handlebar position.

The various example embodiments described herein are described in the general context of method steps or processes, which may be implemented in one aspect by a computer program product, embodied in a transitory or a non-transitory computer-readable medium, including computer-executable instructions, such as program code, executed by computers in networked environments. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. Generally, program modules may include routines, programs, objects, components, data structures, etc. those perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A method for bicycle fitting, comprising:
   identifying a plurality of evaluation factors based on one or more scenario parameters;
   positioning at least one of a saddle and a handlebar to one or more positions when a user is pedaling;
   determining values for the plurality of evaluation factors in response to data received from one or more sensors at the one or more positions;
   processing the values to identify one or more recommended positions for the saddle or the handlebar;
   dividing a region of interest of the one or more recommended positions into a plurality of sub-regions;
   selecting a plurality of sample points within the plurality of sub-regions to be the plurality of positions for positioning at least one of the saddle and the handlebar;
   identifying one of the plurality of sub-regions associated with a corresponding one of the plurality of sample points having a highest score to be the region of interest in a next iteration cycle; and
   identifying a central point of the region of interest in a current iteration cycle as the one or more recommended positions if scores of the plurality of sample points in the current iteration cycle are the same or within a threshold range.

2. The method of claim 1, wherein the one or more recommended positions include a range of recommended positions for at least one of the handlebar and the saddle.

3. The method of claim 1, wherein dividing the region of interest comprises:
   dividing the region of interest into an M×N matrix, M and N being any integers, wherein each cell of the M×N matrix includes one of the plurality of sample points.

4. The method of claim 1, wherein the plurality of evaluation factors comprise a factor associated with a mechanical efficiency of pedaling, a factor associated with a biomechanical efficiency of pedaling, or a user comfort factor during pedaling.

5. The method of claim 1, wherein the one or more sensors comprise a power sensor, a cadence sensor, a position sensor, a speed sensor, a motion sensor, an electromyography sensor, a heart rate sensor, a pressure sensor, a respiratory sensor, an inertial measurement unit sensor, or any combination thereof.

6. The method of claim 1, further comprising:
   receiving the one or more scenario parameters including information associated with riding duration, riding performance, injure parameter, riding circumstance, fitness information of the user, or a combination thereof.

7. The method of claim 1, further comprising:
   storing a plurality of weighting combinations for the plurality of evaluation factors in a database; and
   accessing the database to select one of the plurality of weighting combinations matching the one or more scenario parameters to determine weights of the plurality of evaluation factors for calculating scores corresponding to the one or more positions.

8. An apparatus for bicycle fitting, comprising:
   one or more sensors;
   a saddle and a handlebar;
   one or more storage devices configured to store a set of instructions; and
   one or more processors configured to execute the set of instructions to cause the apparatus to:
      identify a plurality of evaluation factors based on one or more scenario parameters;
      position at least one of the saddle and the handlebar to one or more positions when a user is pedaling;
      determine values for the plurality of evaluation factors in response to data received from the one or more sensors at the one or more positions;
      process the values to identify one or more recommended positions for the saddle or the handlebar;
      divide a region of interest of the one or more recommended positions into a plurality of sub-regions;
      select a plurality of sample points within the plurality of sub-regions to be the plurality of positions for positioning at least one of the saddle and the handlebar;
      identify one of the plurality of sub-regions associated with a corresponding one of the plurality of sample points having a highest score to be the region of interest in a next iteration cycle; and
      identify a central point of the region of interest in a current iteration cycle as the one or more recommended positions if scores of the plurality of sample points in the current iteration cycle are the same or within a threshold range.

9. The apparatus of claim 8, wherein the one or more recommended positions include a range of recommended positions for at least one of the handlebar and the saddle.

10. The apparatus of claim 8, wherein the one or more processors are configured to execute the set of instructions to cause the apparatus to divide the region of interest by dividing the region of interest into an M×N matrix, M and N being any integers, wherein each cell of the M×N matrix includes one of the plurality of sample points.

11. The apparatus of claim 8, wherein the plurality of evaluation factors comprise a factor associated with a mechanical efficiency of pedaling, a factor associated with a biomechanical efficiency of pedaling, or a user comfort factor during pedaling.

12. The apparatus of claim 8, wherein the one or more sensors comprise a power sensor, a cadence sensor, a position sensor, a speed sensor, a motion sensor, an electromyography sensor, a heart rate sensor, a pressure sensor, a respiratory sensor, an inertial measurement unit sensor, or any combination thereof.

13. The apparatus of claim 8, wherein the one or more processors are configured to execute the set of instructions to cause the apparatus to:
    receive the one or more scenario parameters including information associated with riding duration, riding performance, injure parameter, riding circumstance, fitness information of the user, or a combination thereof.

14. The apparatus of claim 8, wherein the one or more processors are configured to execute the set of instructions to cause the apparatus to:
    store a plurality of weighting combinations for the plurality of evaluation factors in a database; and
    access the database to select one of the plurality of weighting combinations matching the one or more scenario parameters to determine weights of the plurality of evaluation factors for calculating scores corresponding to the one or more positions.

15. A non-transitory computer-readable medium that stores a set of instructions executable by one or more processors of an apparatus to initiate a method for bicycle fitting, the method comprising:
    receiving a plurality of evaluation factors based on one or more scenario parameters;
    positioning at least one of a saddle and a handlebar to one or more positions when a user is pedaling;
    determining values for the plurality of evaluation factors according to data received from one or more sensors at the one or more positions;
    processing the values to identify one or more recommended positions for the saddle or the handlebar;
    dividing a region of interest of the one or more recommended positions into a plurality of sub-regions;
    selecting a plurality of sample points within the plurality of sub-regions to be the plurality of positions for positioning at least one of the saddle and the handlebar;
    identifying one of the plurality of sub-regions associated with a corresponding one of the plurality of sample points having a highest score to be the region of interest in a next iteration cycle; and
    identifying a central point of the region of interest in a current iteration cycle as the one or more recommended positions if scores of the plurality of sample points in the current iteration cycle are the same or within a threshold range.

16. The non-transitory computer-readable medium of claim 15, wherein the set of instructions is executable by the one or more processors to cause the apparatus to further perform:
    receiving the one or more scenario parameters including information associated with riding duration, riding performance, injure parameter, riding circumstance, fitness information of the user, or a combination thereof.

17. The non-transitory computer-readable medium of claim 15, wherein the set of instructions is executable by the one or more processors to cause the apparatus to further perform:
    storing a plurality of weighting combinations for the plurality of evaluation factors in a database; and
    accessing the database to select one of the plurality of weighting combinations matching the one or more scenario parameters to determine weights of the plurality of evaluation factors for calculating scores corresponding to the one or more positions.

* * * * *